Dec. 12, 1967   R. J. INGHAM ET AL   3,357,394
GAUGE CONSTRUCTION
Filed June 21, 1965
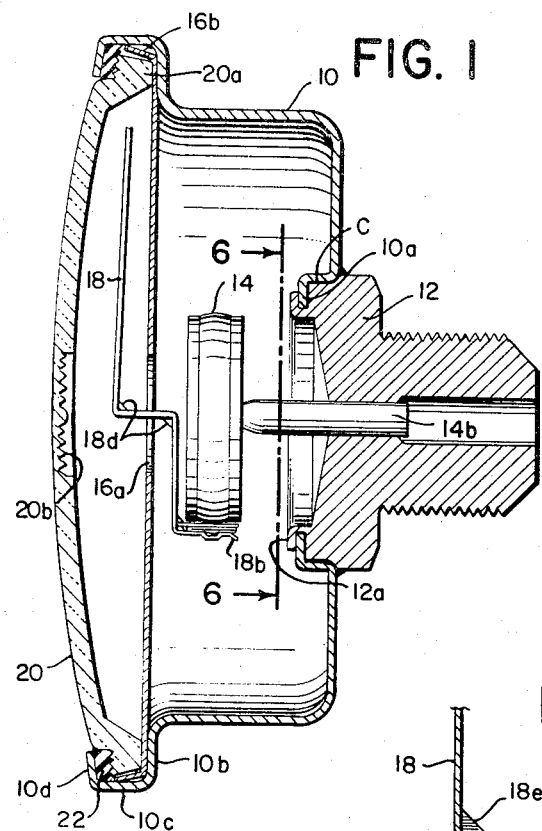
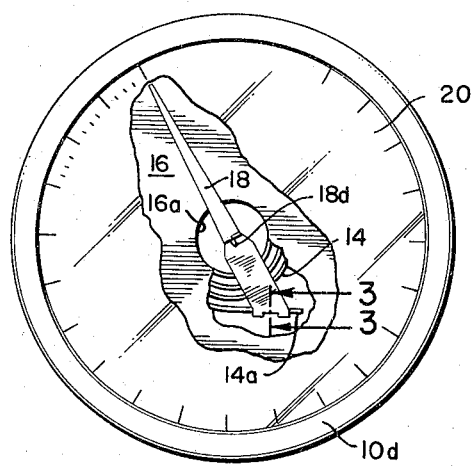
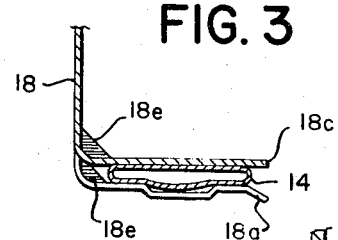
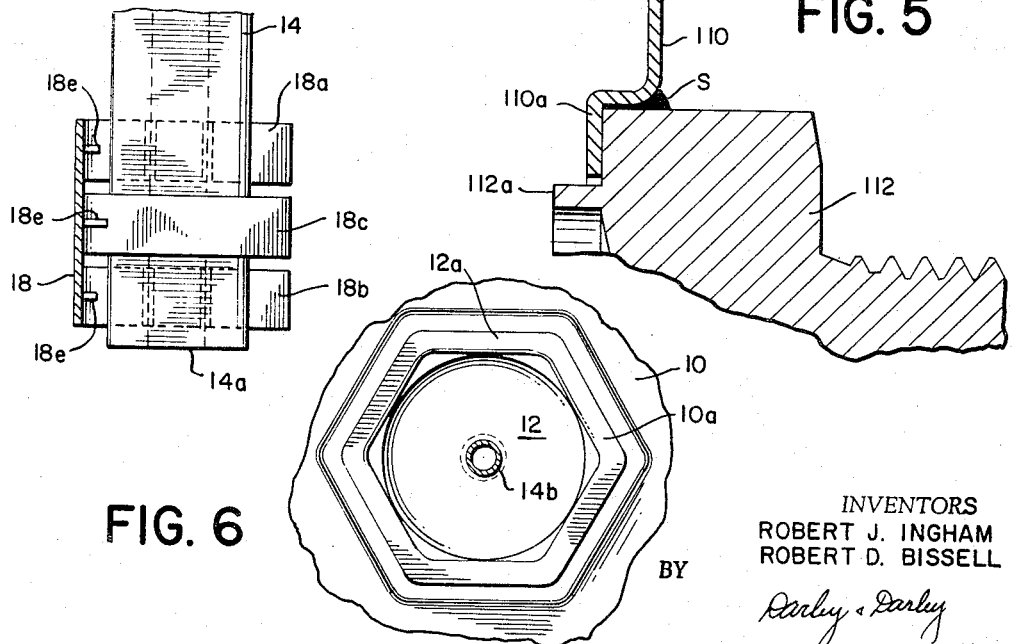
INVENTORS
ROBERT J. INGHAM
ROBERT D. BISSELL
BY Darley & Darley
ATTORNEYS United States Patent Office 3,357,394
Patented Dec. 12, 1967

3,357,394
GAUGE CONSTRUCTION
Robert Joseph Ingham, Fairfield, and Robert Donald
Bissell, Orange, Conn., assignors to Dresser Industries,
Inc., Stratford, Conn., a corporation of Delaware
Filed June 21, 1965, Ser. No. 465,361
7 Claims. (Cl. 116—129)

This invention is directed to novel features of construction in gauges.

One object of this invention is to directly mount the pointer of a Bourdon spring operated pressure gauge on the end of the spring and extend the pointer through an aperture at the center of the dial.

Another object of this invention is to provide a gauge casing of single piece construction which eliminates the use of a conventional, separate, front bezel ring for attaching the crystal thereto.

Another object of this invention is to provide a gauge casing constructed to permit the use of a dial having a maximum scale diameter in relation to the diameter of the housing proper.

Still another object is to provide a novel pointer mounting and construction to increase the effective arc diameter of the scale on the dial, so as to improve its readability.

Another object of this invention is to provide a novel coupling between a gauge casing and its associated socket so that substantial torque may be applied directly to the casing when attaching the socket to a piping system, for example, without destroying the coupling between it and the socket.

Another object of this invention is to provide in a gauge having a casing and a crystal forming one wall thereof a novel structure for connecting these parts together so as to simplify and reduce the cost of mounting the crystal in the casing.

Still another object of the invention is to provide in gauges of the type indicated above novel constructions whereby the compartment for the operating mechanism is rendered watertight during installation and for long periods of use.

A further object of this invention is to provide a gauge casing having an integral angular flanged seat for a dial having radial tabs dimensioned to frictionally engage a wall of the flange to hold the dial in calibrated position until the crystal is mounted.

Still another object of the invention is to provide for a leakproof and torque resistant joint between a gauge casing and a fluid supply and mounting socket, wherein the mounting socket is pressure expanded radially in a seat in the casing to close any small apertures that might otherwise exist.

Other objects, functions and advantages of this invention will be apparent from the following description of the embodiments thereof selected for illustration and disclosure herein. In the accompanying drawings:

FIGURE 1 is a vertical central longitudinal cross sectional view through a pressure gauge embodying the novel features of this invention;

FIGURE 2 is a front elevational view of this gauge with some parts broken away for clarification;

FIGURE 3 is an enlarged detailed cross sectional view taken on the line 3—3 of FIGURE 2;

FIGURE 4 is a top plan view of the subject matter of FIGURE 3;

FIGURE 5 is an enlarged cross sectional view of details involving a modification of the structure of FIGURE 1; and FIGURE 6 is an elevational view from the plane 6—6 of FIG. 1.

As illustrated, the pointer construction and support is of particular utility with fluid pressure gauges of the type employing as part of the operating mechanism a Bourdon spring. It is of special value for such springs having a spiral form. In prior gauges of this type it has been not uncommon to attach the pointer to the free end of the spiral Bourdon spring and extend the pointer around the outside diameter of the dial. In order to do this the dial has a diameter less than the inside diameter of the casing so as to provide an annular passage therebetween in which the pointer can move. As is well known with such a construction the effective arc diameter of the scale on the dial is less than the outside diameter of the dial because of the length of the pointer extending inward from the periphery of the dial.

In accordance with this invention, the pointer is still connected to the end of the spiral Bourdon spring, but is offset intermediate its length so as to pass through a central opening in the dial and then extend across the face of the dial. With this construction the dial may be made as large as the inside diameter of the case and the pointer radius can be equal to the effective dial radius. It results that the active dial arc length can be increased and as a result the readability of the instrument improved.

The illustrative example comprises a cylindrical casing 10 of cup-shaped form having a radial flange at its open side integral with an axial extension 10c thereof and terminating in an in-turned radial flange 10d. The rear wall of the casing has an aperture which is defined by a reentrant wall terminating in an inwardly extending radial flange 10a. Mounted in the recess formed by the reentrant formation is a socket 12 having an externally threaded nipple and a central passage therethrough. The cross-sectional shape of the socket defined by the reentrant wall and that of the socket are the same and the socket is secured to the casing by the out-turned integral flange 12a which encloses the flange 10a. Any possibility of leakage in this area is prevented by a curable adhesive C. As will be referred to later, and as illustrated in FIG. 6, the in-turned formation on the rear wall of the casing 10 can have a non-circular form, such as the hexagonal shape shown in FIG. 6.

Within the compartment defined by the casing 10 is the pressure fluid operated Bourdon spring 14 which, in this case, is of spiral form, see FIG. 2. The inner end of the spring terminates in a tubular extension 14b extending at right angles to the plane of the Bourdon spring and sealed in any suitable manner in the passage in the socket 12. The free end 14a of the spring has a pointer 18 mounted thereon. At one end the supporting pointer is provided with the tabs 18a and 18b lying in a lower plane and the intermediate tab 18c lying in an upper plane. These tabs are spaced and shaped to clip over the end 14a of the spring to mount the pointer and this attachment may be supplemented, if desired, by solder or adhesive. The pointer 18 comprises two substantially parallel sections, see FIG. 1, lying substantially parallel to the plane of the spring and connected by a perpendicular section. One parallel portion is attached to the Bourdon spring 14 and projects toward the center axis thereof between the spring and the adjacent and parallel dial plate 16 and the other parallel portion projects away from the center axis of the spring 14 toward the periphery of the dial plate 16. Joining these parallel portions is a connecting portion which is on the axis of the spring 14 and passes through the aperture 16a in a dial 16 which is seated on the flange 10b. At the periphery of the dial are a series of radial tabs, for example, the tab 16b, FIG. 1. These tabs, of which three or more are required with equalized circumferential spacing, are dimensioned to exert spring friction pressure on the casing extension 10c when placed on its seat. Thus the dial is held against displacement until the crystal is installed, which then locks it in place by axial pressure. As diagrammatically illustrated in the various figures, the pointer structure is strengthened by the dimples 18e at the corners of the bends which form the tabs 18a, 18b and 18c. The pointer is also strenghened by similar dimples 18d at the bent corners offsetting the pointer sections.

The dial 16 is overlaid by a transparent crystal 20 of any suitable material. A compressible gasket 22 in the form of an annular ring engages the peripheral face of the enlargement 20a which face can be serrated as indicated. The terminal flange 10d is in-turned over the gasket to place it under compression and to firmly seat the crystal on the dial. This insures a fluid-tight seal in this region. It is noted from the construction illustrated that the crystal has a substantially greater diameter than the main body 10 of the casing so as to expose an enlarged dial area and make it possible to have a scale of maximum diameter. The center of the crystal 20b is of reduced thickness so as to provide a region of ready fracture in the event of undesired pressure build up within the sealed casing. This feature is the subject matter of a copending application of Robert Joseph Ingham, filed Apr. 9, 1965, Ser. No. 446,896.

Since it is likely that the gauge thus described may be mounted in a pipe system or other place of use by threading the nipple of the socket into a receptacle, by the application of torque to the gauge housing, the non-circular cross-sectional shape employed in connecting the two together insures against damage. For example, the hexagonal shape of the re-entrant portion of the rear wall of the casing and the corresponding shape of the socket insures that damage resulting from the application of torque to the casing will not occur.

As a further strengthening of this connection and insurance against the entry or escape of pressure fluid, the mating surfaces of the casing and the socket can be coated, as previously mentioned, with a curable cement C. In order to provide the required space for the cement C the socket may be dimensioned to provide a small clearance in the integral recess formed by the re-entrant structure described above.

As an alternative structure for connecting the casing and socket together, reference is made to FIG. 5, having in mind that the rear wall 110 of the casing is provided as before with a non-circular re-entrant formation terminating in the radial flange 110a. The socket 112 will, as before, be provided with a deformable flange 112a which can be folded outwardly over the flange 110a, as illustrated in FIG. 1. In this case, however, the clearance between the two, especially at the corners of the hexagonal section, can be reduced by applying sufficient force to the outer face of the socket so as to expand it radially beyond the elastic limit of the material. This insures a firm torque resistant connection between the two parts capable of withstanding substantial torque supplied to the gauge casing. Solder or sealant S can also be applied at this joint to provide against fluid leakage. From the above description it will be apparent to those skilled in this art that the novel features herein disclosed are capable of change without departure from the novelty of the invention. It is intended, therefore, that the scope of protection afforded by the claims granted herein shall be defined by them.

What is claimed:

1. In gauge apparatus for indicating changes in a condition and including; a spiral condition responsive element adapted for winding and unwinding movements in response to changes in a sensed variable condition; wherein the improvement comprises a dial plate having a central opening mounted adjacent said spiral condition responsive element substantially perpendicular and generally coaxial with the center axis thereof; support means attached to one end of said spiral condition responsive element and supporting said element free of said dial and a pointer element removably attached to the other end of said spiral condition responsive element displaced from said center axis and including a first portion substantially parallel to said dial plate and projecting between said dial plate and said spiral condition responsive element toward the center axis thereof, a second portion projecting from a connection with said first portion in a direction away from said spiral condition responsive element and through an opening in said dial plate substantially in the vicinity of said center axis, and a third portion substantially parallel to said dial plate and projecting from a connection with said second portion away from the center axis of said spiral condition responsive element.

2. A gauge apparatus according to claim 1 wherein said spiral condition responsive element comprises a spiral Bourdon tube adapted for connection to a source of fluid pressure.

3. A gauge apparatus for indicating changes in a condition and comprising a spiral Bourdon tube adapted for connection to a source of fluid pressure for winding and unwinding movements in response to condition changes sensed in said fluid pressure; support means attached to one end of said Bourdon tube; a dial plate mounted adjacent said Bourdon tube and substantially perpendicular to the center axis thereof; and a pointer element adjustably attached to the other end of said Bourdon tube with a clip assembly having spring loaded fingers which engage said other end of said Bourdon tube, said pointer including a portion substantially parallel to said dial plate and projecting between said dial plate and said Bourdon tube toward the center axis thereof, a portion projecting in a direction away from said Bourdon tube and through an opening in said dial plate, and a portion substantially parallel to said dial plate and projecting away from the center axis of said Bourdon tube.

4. A gauge apparatus comprising a condition responsive mechanism, a casing enclosing said condition responsive mechanism, said casing having a laterally offset wall portion defining an aperture therethrough and formed with a noncircular periphery, a socket including an end portion shaped complementary to said offset wall portion interlocked therewith, a bore extending through said socket aligned with said aperture to provide a path for fluid communication with the casing interior, and a threaded portion on said socket adapted to permit mounting of said gauge apparatus, and means forming a fluid tight seal between said wall portion and the interlocking end portion of said socket.

5. The gauge apparatus according to claim 4 in which said offset wall portion comprises an inwardly formed recess receiving said end portion of said socket interlocked therein.

6. The gauge apparatus according to claim 4 in which said condition responsive element comprises a Bourdon tube one end of which is supported through said aperture within the bore of said socket.

7. The gauge apparatus according to claim 4 in which said interlock between said offset wall portion and said socket end portion includes a permanent expanded deformation of one against the other.

(References on following page)

References Cited

UNITED STATES PATENTS

| | | | |
|---|---|---|---|
| 514,256 | 2/1894 | Bristol | 73—411 |
| 537,588 | 4/1895 | Steinle | 73—411 |
| 576,208 | 2/1897 | Lozier | 73—411 |
| 1,195,334 | 8/1916 | Bristol | 73—411 |
| 1,294,846 | 2/1919 | Strzyczkowski | 73—411 |
| 1,462,570 | 7/1923 | Gelatt | 73—416 |
| 1,474,173 | 11/1923 | Scott | 73—431 |
| 1,709,561 | 4/1929 | Bristol | 73—411 |
| 1,751,867 | 3/1930 | Manuel | 73—411 |
| 1,798,645 | 3/1931 | Withers | 73—411 |
| 1,978,750 | 10/1934 | Klein | 73—411 |
| 2,311,387 | 2/1943 | Hastings | 73—317 |
| 2,693,896 | 11/1954 | Brown | 73—416 |
| 2,726,002 | 12/1955 | Dalianis | 220—27 |
| 2,929,249 | 3/1960 | Lindsay | 73—418 |
| 3,147,623 | 9/1964 | Johnson et al. | 73—418 |
| 3,163,046 | 12/1964 | Huston | 73—418 |
| 3,184,589 | 5/1965 | Gibbens | 240—10.67 |
| 3,209,599 | 10/1965 | Harland et al. | 73—431 |

LOUIS J. CAPOZI, *Primary Examiner.*